Sept. 6, 1949.  J. A. SCAPARRO  2,481,447
NUTCRACKER WITH ADJUSTABLE SPACER CAM
Filed Oct. 2, 1945
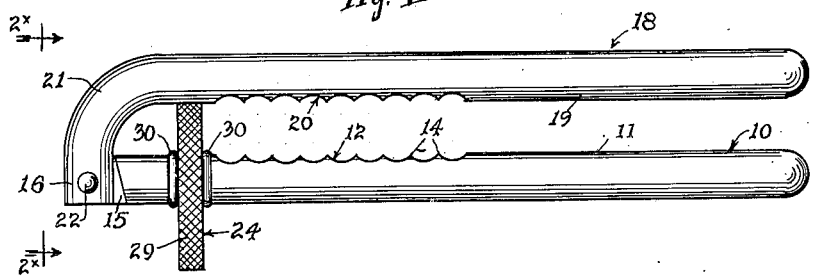
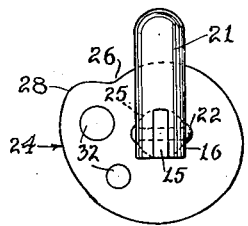
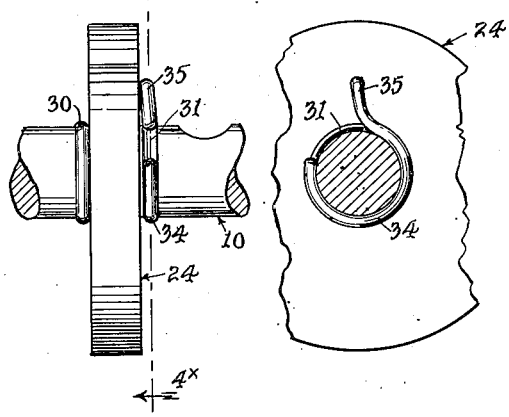
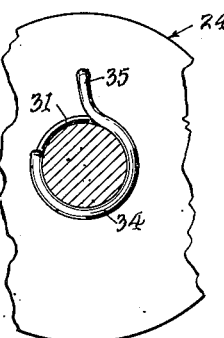
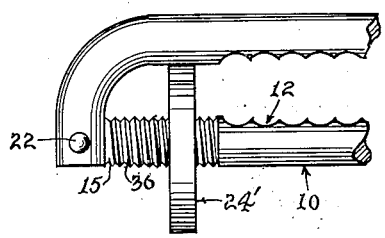
INVENTOR
Joseph A. Scaparro
BY
ATTORNEYS Patented Sept. 6, 1949

2,481,447

UNITED STATES PATENT OFFICE 2,481,447

NUTCRACKER WITH ADJUSTABLE SPACER CAM

Joseph A. Scaparro, Brooklyn, N. Y.

Application October 2, 1945, Serial No. 619,786

8 Claims. (Cl. 146—13)

This invention relates to nutcrackers, more particularly to nutcrackers of the type having a pair of pivoted levers between which the nut is gripped and cracked by manual manipulation of the levers.

In the operation of the usual nutcrackers, the sudden release of pressure when the shell cracks is liable to result in undesirable crushing of the nut meats. Sudden closing of the jaws is also liable to pinch the hand of the user.

The principal object of the invention is to provide a non-crushing nutcracker in which the closure of the jaws or levers may be selectively limited.

Another object is to provide closure-limiting means which may be rapidly and easily adjusted with reference to each individual nut.

Further objects are to provide means for adjusting the longitudinal position of the closure-limiting means relative to the levers and means for frictionally restraining its rotation.

The invention will be better understood by reference to the following detailed description of the present preferred embodiment thereof taken in connection with the drawings in which:

Fig. 1 is an elevation of a complete nutcracker in accordance with the invention;

Fig. 2 is an end view taken on the line 2x—2x of Fig. 1;

Figs. 3 and 4 are enlarged details illustrating the cam-securing means, Fig. 4 being taken on the line 4x—4x of Fig. 3; and Fig. 5 is a fragmentary elevation of the end of a nutcracker showing a modified form of cam mounting.

Referring to Figs. 1 and 2, the illustrative embodiment comprises a straight lever 10 which is preferably in the form of a cylindrical bar. This lever has a handle portion 11 and a nut-cracking portion 12 provided with serrations or teeth 14. The end of this lever is flattened as at 15 so as to fit within the bifurcated end 16 of an upper lever 18. The upper lever 18 is similar to the lever 10, having a handle portion 19 and a nut-gripping portion 20. Its end is curved as at 21 so as to extend approximately at right angles to the main body of the lever so that when the levers 10 and 18 are pivotally connected, as by the rivet 22, and are parallel there is a space between the nut-gripping portions 12 and 20 slightly less than the diameter of the smallest nut which it is desired to crack.

The stop means for limiting the movement of the levers 10 and 18 toward one another, that is to say their closure, comprises a freely rotatable cam 24 of the plate or peripheral type. This cam is provided with a circular axial opening 25 of a size to fit on the cylindrical end of lever 10 and its periphery is so shaped that the cam gradually increases in radius from its minimum radius 26 to its maximum radius 28. The peripheral surface of the cam 24 may be knurled or otherwise roughened as shown at 29 to facilitate turning it.

Referring to Figs. 2, 3, and 4, the cam 24 may be rotatably secured on the lever 10 by snap rings 30 which are seated in spaced grooves 31 on the shaft 10. The snap rings are made of spring wire and have spaces between their ends large enough to make it possible to slip them over the lever without permanent distortion.

If the cam is so mounted as to be freely rotatable on the lever 10, it is preferably balanced so that it will not rotate under the influence of gravity. Balancing may be done by providing it with perforations 32 or otherwise removing some of the material from the larger side of the cam.

As an alternative construction, the cam may be frictionally held against rotation by means of the special snap ring 34 shown in Figs. 3 and 4. This snap ring has one of its ends turned outwardly and bent slightly out of the plane of the ring as shown at 35 so that when it is assembled on shaft 10, adjacent the cam 24, it will frictionally engage one of the faces thereof. One or both of the snap rings may be so formed.

In Fig. 5 a modified mounting for the cam is illustrated in which the outer end of lever 10 between its flat portion 15 and its nut-cracking portion 12 is provided with a screw thread 36. In this construction, the cam 24' has its axial opening threaded to correspond to the thread 36 and it will be observed that in addition to being rotatable on the lever 10, it may be adjusted longitudinally thereof, with the advantages hereinafter described.

In operating the nutcracker illustrated in Figs. 1 through 4, the levers 10 and 18 are manipulated in the usual manner, the nut being placed between the gripping surfaces 12 and 20 by one hand while the handles 11 and 12 are held in the other hand. After the nut is in place and before pressure is applied to crack it, the cam 24 is rotated by the fingers of the hand which positions the nut so as to provide any desired amount of clearance between the upper surface of the cam and the adjacent surface of lever 18. It will be observed that by selective spacing of these two members any desired degree of closure may be had or any desired cracking force may be applied. When the lever 18 comes in contact with the cam 24, the levers 10 and 18 will be positively prevented from closing any further.

It will be appreciated that if the cam 24 is positioned close to the pivot 22, small movements of the cam will bring about relatively large changes in the permissible closure of the levers. As the cam is moved away from the pivot, the amount of change made in the limitation of the closure of the levers by any given rotation of the cam will be decreased. In the structure shown in Fig. 5, advantage is taken of this fact and the effectiveness of a given rotation of the cam 24' may be changed by positioning the cam at various points along the screw 36.

While the embodiments shown are both nutcrackers in which the levers are pivoted together at their ends, it is obvious that the above described means for limiting the movement of the levers, which comprises a cam mounted on one lever and adapted to engage the other lever, is equally adaptable and would function in the same manner in a nutcracker in which the levers are pivoted together between their ends with their handles on one side of the pivot and their nutcracking portions on the other side of the pivot. It is also contemplated that numerous other changes in the details of construction may be made in practicing the invention.

The invention is, therefore, not to be limited to the specific embodiments shown, which are to be construed merely as illustrations of the invention and not as limitations thereof, the scope of the invention being as defined in the appended claims.

What is claimed is:

1. In a nutcracker comprising a pair of cracking jaws, means for limiting the approach of said jaws toward one another comprising a rotatable cam plate mounted on one of the jaws to rotate around the jaw and adapted for peripheral contact with the other jaw, said cam plate being balanced by removal of material from the side having the greater radius so as to have no tendency to rotate under the force of gravity.

2. A nutcracker according to claim 1 having a cam plate balanced by one or more holes therein on the side having the greater radius.

3. A nutcracker having a pair of cracking jaws, one of said jaws being provided with a cylindrical portion having spaced circumferential grooves, a cam plate rotatably mounted on said cylindrical portion between said grooves for limiting the closure of said jaws, and cam retaining means comprising resilient lock rings seated in said grooves and frictionally engaging said cam.

4. A nutcracker according to claim 3 in which at least one of said lock rings has an upstanding end bent to bear against said cam plate to frictionally restrain its rotation.

5. A nutcracker comprising a pair of levers pivoted together at their ends, one of said levers being substantially straight and the other lever having its pivoted end extending substantially at a right angle to its body, each of said levers having a handle section remote from its pivot and an intermediate nut-gripping portion, said straight lever having a cylindrical portion intermediate its pivot and its nut-gripping portion on which there are spaced circumferential grooves, a plate cam for limiting the closure of said levers rotatably mounted between said grooves, and lock rings seated in said grooves to maintain the cam in place while permitting it to rotate.

6. A nutcracker comprising a pair of levers pivoted together at their ends, one of said levers being straight adjacent its pivot and the other lever having an angular end adjacent its pivot, said straight-ended lever being threaded throughout a section extending away from the pivot, a plate cam having a threaded axial opening adapted to screw onto the threaded lever end, said cam being adapted to engage the other lever to limit its closure and being rotatable about the threaded lever section.

7. A nutcracker comprising a pair of levers pivoted together, one of said levers having a threaded section adjacent its pivotal point, and a plate cam having a threaded axial opening adapted to rotate about and move longitudinally of said threaded section, said cam serving to permit selective limitation of the closure of said levers by peripheral contact with the lever pivoted to the one on which it is mounted.

8. In a nutcracker, in combination, a pair of pivoted levers adapted for manual operation, one of said levers having a cylindrical portion adjacent to and spaced from the pivot point, a plate cam of gradually increasing radius and having a circular opening about its axis of rotation and of a size to fit on said cylindrical portion, said cam being mounted on said cylindrical portion of said lever for rotation thereabout and adapted to contact the other of said levers, and means for preventing sliding of said cam longitudinally of the lever on which it is mounted, whereby the maximum closure of said levers is adjustable by rotation of the cam about the lever upon which it is mounted.

JOSEPH A. SCAPARRO.

REFERENCES CITED

The following references are of record in the file of this patent:

UNITED STATES PATENTS

| Number | Name | Date |
|---|---|---|
| 768,062 | Mather | Aug. 23, 1904 |
| 1,123,852 | Costa | Jan. 5, 1915 |
| 1,312,149 | Zalis | Aug. 5, 1919 |
| 1,578,438 | Hintz | Mar. 30, 1926 |
| 2,398,209 | Clemens | Apr. 9, 1946 |